INVENTOR.
Rudolph F. Poklar &
BY Richard E. Kraemer
Paul J. Ethington
ATTORNEY 3,264,881
POWER SUPPLY FOR GYROSCOPES
Rudolph F. Poklar and Richard E. Kraemer, Milwaukee, Wis., assignors to General Motors Corporation, Detroit, Mich., a corporation of Delaware
Filed May 4, 1962, Ser. No. 192,497
4 Claims. (Cl. 74—5.7)

This invention relates to gyroscopic instruments and more particularly to power supply systems for hysteresis motors in such instruments.

In precision gyroscopes, such as those used as stabilization gyroscopes in inertial guidance systems, the performance is seriously impaired by minute variations in drift rate. It is well known that one cause of gyroscope drift is mass unbalance about the gyroscope output axis which may be produced by non-symmetrical thermal expansion within the gimbal assembly due to temperature gradients.

In such gyroscopes it is a common practice to employ a hysteresis motor as the spin motor for the gyroscope wheel and to use a regulated or constant voltage power supply for energizing the motor. It has been found, however, despite voltage regulation of the supply, transient voltages from various disturbances in the system do reach the spin motor and, by affecting the magnetic circuit, cause a persistent change in motor impedance. Further, it has been found that the impedance of a hysteresis motor is dependent upon its "magnetic history" to the extent that the motor may exhibit, after coming up to speed, a somewhat different impedance from that exhibited after previous starts. As a result of the motor impedance changes in a constant voltage system, the power dissipated by the motor changes and causes temperature gradients which result in mass unbalance and hence a change in gyroscope drift rate.

In accordance with this invention, this adverse effect on gyroscope drift rate is substantially eliminated by energizing a hysteresis synchronous motor at a substantially constant power level despite motor impedance changes. Since it has been found that the reactive component of impedance is subject to change while the resistive component remains constant, a substantially constant power level may be achieved by means of a constant current power supply.

Figure 1:
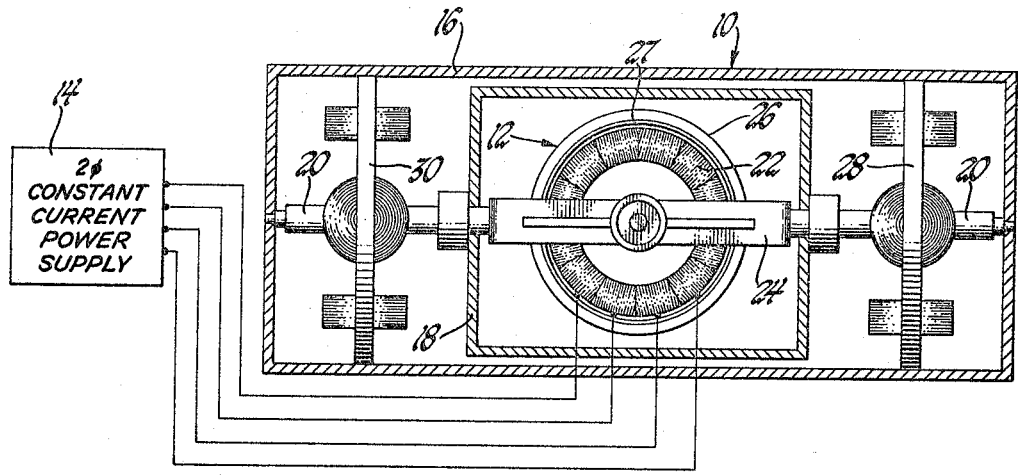
Figure 2:
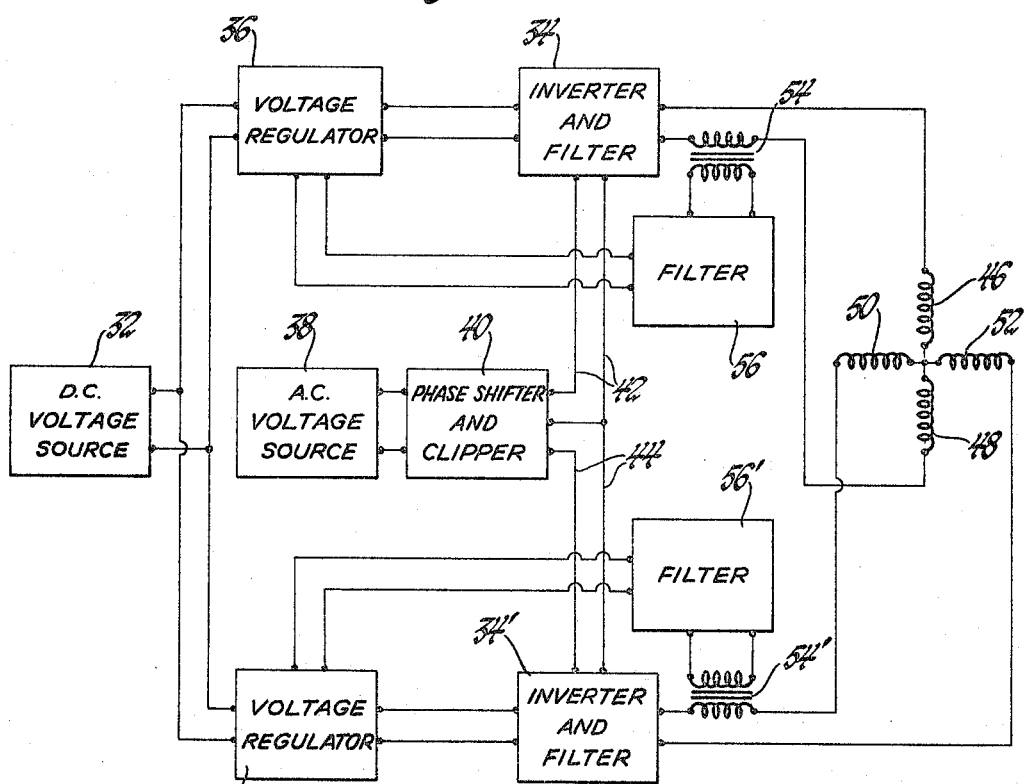

A more complete understanding of the invention may be had from the detailed description which follows taken from the accompanying drawings in which:

FIGURE 1 is a diagrammatic representation of the constant current power supply and gyroscope; and FIGURE 2 is a block diagram of a preferred form of constant current power supply.

Referring now to the drawings, there is shown an illustrative embodiment of the invention in a system embodying a single degree of freedom stabilization gyroscope 10 having a two-phase hysteresis synchronous spin motor 12 energized from a two-phase constant current power supply 14.

The gyroscope 10 comprises a cylindrical casing or support member 16 within which is disposed a gimbal assembly including a cylindrical float 18 mounted for rotation about the gyroscope output axis on shafts 20. Within the float is disposed a spin motor 12 having a stator 22 fixed to a gimbal 24 and a rotor including a gyroscope wheel 26 mounted upon the gimbal for rotation about the gyroscope spin reference axis. The motor is of the hysteresis synchronous type and is energized by two-phase stator windings. The rotor includes a hysteresis ring 27 of hard hysteresis material on its inner periphery spaced from the stator poles by a small air gap.

The gyroscope also includes a signal generator 28 suitably in the form of a signal microsyn for developing a signal corresponding to the angular displacement of the output shaft. A torque generator 30, such as a torque microsyn, may be provided to exert control torques on the output shaft in accordance with the particular application of the gyroscope. The space between the float 18 and the casing 16 is filled with a viscous liquid to support the gimbal assembly in substantially neutral buoyancy and to provide a desired degree of viscous damping on the float.

The gyroscope just described is of well known configuration and responds to angular motion about an input axis, normal to the spin axis, by precession about the output axis and hence the output signal of the signal generator is a measure of input motion. In such a gyroscope, the gimbal assembly must be accurately balanced about the output axis to avoid undesired torques which produce gyroscope drift. The accuracy of a sensitive instrument may be seriously impaired by very slight changes which produce an unbalance about the output axis. The occurrence of temperature gradients in the gimbal assembly is one cause of mass unbalance because such gradients will produce non-symmetrical expansion of components in the assembly. It has been found that temperature gradients are produced by variations in the power dissipated by the spin motor and such variations are especially prevalent in systems using a constant voltage power supply.

The conventional hysteresis synchronous motor is energized from a polyphase source and the stator windings produce a rotating magnetic field which rotates at a synchronous speed determined by the power supply frequency and the number of poles. Starting torque is imparted to the rotor through the magnetic field and the rotor speed is increased by induction motor action toward synchronous speed. The rotating magnetic field of the stator induces magnetic poles in the hysteresis ring and by reason of its high retentivity, the magnetic poles become increasingly stronger as synchronous speed is approached due to the longer period of exposure to the stator field. By the action of the magnetic poles in the hysteresis ring on the rotor, the rotor is pulled into synchronism with the rotating magnetic field and hence, the running speed of the hysteresis motor is determined only by the supply voltage frequency.

With the hysteresis motor running at synchronous speed the motor impedance includes a substantially constant resistive component which arises from the resistance of the stator windings, the friction and windage losses, and the hysteresis and the eddy current losses. The motor impedance also includes a reactive component arising from the inductance of the stator windings. It has been found that the reactive component of motor impedance is subject to change during motor operation by reason of momentary voltage transients applied to the stator windings. Such transients may occur because of switching actions within or associated with the power supply or because of electrical noise in the supply circuits and, as a practical matter, may reach the stator windings in spite of regulation of the power supply. When a voltage transient is applied to the stator windings, a surge of current occurs and intensifies the magnetic field of the stator. Consequently, the magnetic poles in the hysteresis ring become stronger and, due to the retentivity of the hysteresis ring, the increased strength of the poles will persist long after the occurrence of the voltage transient. The stronger magnetic poles in the hysteresis ring produce additional flux lines which cut the stator coils and effectively increase the inductance of the stator windings.

In the case of a constant voltage power supply for the spin motor, an increase of inductance of the stator windings results in a decrease in the current drawn by the motor. The effect of decreasing the motor current flow through the same value of resistance is to decrease the power dissipated in the form of heat by the motor. The change of power dissipation produces temperature gradients in the gimbal assembly which may cause non-symmetrical expansion or contraction in the assembly and hence mass unbalance about the output axis with a resultant change in drift rate.

In accordance with this invention, the hysteresis spin motor is energized from a constant current power supply 14 so that changes of inductance in the stator windings, due to voltage transients or other causes, do not result in a change of current flow to the motor and hence the average power dissipated in the motor remains substantially constant. A constant current power supply may be of conventional design and is preferably of the type shown in FIGURE 2. The constant current power supply comprises a voltage source 32 which supplies direct current power to a pair of inverters 34 and 34' through respective voltage regulators 36 and 36'. The inverters 34 and 34' are of conventional design and preferably take the form of keyed transistor oscillators which operate to invert the input direct voltage to an alternating output voltage. Both of the inverters include filter networks to eliminate the harmonic content from the alternating voltage output. In order to maintain a constant frequency of the output voltages of the inverter and to maintain a quadrature phase relation therebetween as required for a two-phase source, the inverters are synchronously driven or keyed by a square-wave voltage derived from an alternating voltage source 38 through a phase shifter and clipper 40. The phase shifter produces a first output voltage on conductors 42 of a reference phase and a second output voltage on conductors 44 of a quadrature phase. The output voltages of the phase shifter, which are maintained at constant amplitude by a clipper network in the phase shifter, are applied respectively to the switching input terminals of the inverters 34 and 34'. Accordingly, the inverter develops an alternating output voltage of fixed frequency and phase which is applied to the first phase windings 46 and 48 on the stator of the hysteresis motor. Similarly, the inverter 34' develops an output voltage of fixed frequency and 90 degrees out-of-phase with the output voltage of inverter 34. The output voltage of inverter 34' is applied across the second phase windings 50 and 52 of the stator of the motor. In order to maintain the motor energizing currents at substantially constant values despite motor impedance changes, a control voltage proportional to motor current in each phase is developed. For the first phase, this is accomplished by a current transformer 54 having its primary winding connected in series with the phase windings 46 and 48. The control voltage across the secondary winding of the current transformer is applied degeneratively through a feedback circuit including a filter 56 to the control terminals of the voltage regulator 36. Similarly, for the second phase, a current transformer 54' has its primary winding connected in series with the phase windings 50 and 52 and the control voltage developed by the secondary winding is applied in a degenerative sense through a feedback circuit including a filter 56' to the control terminals of voltage regulator 36'. The feedback circuits, including filters 56 and 56', preferably, have a time constant of small value so as to maintain very close regulation of the current output but large enough to prevent instability of the regulating system.

In the operation of the power supply for the gyroscope spin motor, the direct current power from the voltage source 32 is supplied through the respective voltage regulators 36 and 36' to the inverters 34 and 34'. The inverters operate at constant frequency and in fixed quadrature phase relationship as controlled by the alternating voltage source and the phase shifter 40. The output voltages of the inverters 34 and 34', however, are of variable amplitude as determined by the magnitude of the direct voltage supplied by the respective voltage regulators 36 and 36'. With the spin motor of the gyroscope rotating at synchronous speed, the power dissipated by the motor remains substantially constant. When the reactance of either of the stator windings changes, as a result of a transient voltage or other causes, the impedance of the winding will change, since the resistive component will remain constant. With increased impedance, for example in windings 46 and 48 of the first phase, the motor will tend to draw less current from the power supply and cause a decrease of the control voltage across the current transformer 54. The decreased control voltage, applied through the filter 56 to the voltage regulator 36, will cause the voltage regulator output voltage to increase and hence the output voltage of the inverter will be increased. Consequently, the current supplied to the windings 46 and 48 is maintained at its regulated value in spite of the change of impedance. Therefore, the power dissipated in the motor remains substantially constant, because the resistive component of the impedance is unchanged, and no appreciable temperature gradients are produced which would cause mass unbalance and a change in gyroscope drift rate.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

We claim:

1. In combination, an inertial sensing device comprising a hysteresis motor having a rotor including a gyroscope wheel and a stator for imparting driving torque to the rotor, and a constant current, alternating voltage power supply connected with the stator for energization thereof.

2. In combination with a gyroscope of the type having a hysteresis spin motor, the motor comprising a rotor including a gyroscope wheel and a hysteresis ring and comprising a stator with energizing windings for imparting driving torque to the rotor, the impedance of the stator windings having a substantially constant resistive component and having an inductive component which varies in magnitude in accordance with the magnetic history and the retentivity of the hysteresis ring, the improvement comprising a constant current alternating voltage power supply connected with the stator windings for energization thereof whereby the power dissipated by the motor is substantially constant.

3. In combination with a gyroscope of the type having a hysteresis spin motor, the motor comprising a rotor including a gyroscope wheel and a hysteresis ring and comprising a stator with energizing windings for imparting driving torque to the rotor, the impedance of the stator windings having a substantially constant resistive component and having an inductive component which varies in magnitude in accordance with the magnetic history and the retentivity of the hysteresis ring, the improvement comprising a power supply including an alternating voltage source having output terminals connected with said stator windings, voltage regulating means connected with said source and adapted to vary the amplitude of the output voltage of said source in response to a control voltage, current responsive means connected in series with the stator windings and adapted to develop a control voltage corresponding to the current drawn by the stator windings, the current responsive means being connected with the regulator to vary the output voltage of the source oppositely from the variations in the current drawn by said windings whereby the motor is supplied with a substantially constant value of current and the power dissipated by the motor remains substantially constant.

4. In combination, a gyroscope comprising a support member, a gimbal mounted on the support member for rotation about an output axis, a gyroscope wheel mounted for rotation in said gimbal about a spin axis, a hysteresis motor having a rotor including the gyroscope wheel and having a stator mounted on the gimbal for imparting rotation to the rotor whereby the gyroscope wheel precesses about the output axis in response to rotation of the support member about an input axis normal to the spin axis, a signal generator operatively connected between the gimbal and the support member to develop an output signal corresponding to the angular displacement of the gimbal as a measurement of the rotational motion about the input axis, said measurement being subject to inaccuracy due to unbalanced torques about the output axis arising from mass unbalance produced by temperature gradients in said motor and gimbal, and a constant current, alternating voltage power supply connected with the motor for energization thereof, said motor having a substantially constant resistance and a variable reactance whereby the motor dissipates substantially constant power.

References Cited by the Examiner

UNITED STATES PATENTS

| | | | |
|---|---|---|---|
| 2,512,317 | 6/1950 | Edwards et al. | 318—432 |
| 2,876,643 | 3/1959 | Schaberg | 74—5.7 |

MILTON KAUFMAN, *Primary Examiner.*

BROUGHTON DURHAM, *Examiner.*

K. DOOD, *Assistant Examiner.*